United States Patent
Guthrie et al.

(10) Patent No.: US 9,872,263 B1
(45) Date of Patent: *Jan. 16, 2018

(54) GENERATING REFERENCE SIGNALS FROM SELECTED SIGNALS

(71) Applicant: Sprint Communications Company L.P., Overland Park, KS (US)

(72) Inventors: Steven K. Guthrie, Kansas City, MO (US); John Austin Holmes, Olathe, KS (US); David Richard Polson, Olathe, KS (US); Timothy Hugh Pearson, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 816 days.

This patent is subject to a terminal disclaimer.

(21) Appl. No.: 14/187,986

(22) Filed: Feb. 24, 2014

Related U.S. Application Data

(63) Continuation-in-part of application No. 14/018,948, filed on Sep. 5, 2013, now Pat. No. 9,137,767.

(51) Int. Cl.
*H04W 56/00* (2009.01)
*H04L 7/02* (2006.01)
*H04W 84/04* (2009.01)

(52) U.S. Cl.
CPC ............ *H04W 56/001* (2013.01); *H04L 7/02* (2013.01); *H04W 84/045* (2013.01)

(58) Field of Classification Search
CPC .... H04W 56/001–56/0025; H04J 3/06–3/0697
See application file for complete search history.

(56) References Cited

U.S. PATENT DOCUMENTS

| | | | |
|---|---|---|---|
| 2009/0323843 A1* | 12/2009 | Yang | H04L 27/2672 375/260 |
| 2010/0067507 A1 | 3/2010 | Park | |
| 2011/0188480 A1 | 8/2011 | Takagi | |
| 2011/0305146 A1* | 12/2011 | Rausch | H04H 20/86 370/252 |
| 2012/0094652 A1 | 4/2012 | Kilgour | |
| 2012/0231807 A1 | 9/2012 | Kong et al. | |
| 2012/0275554 A1* | 11/2012 | Lindqvist | H04W 56/0035 375/362 |
| 2013/0010658 A1 | 1/2013 | Zhu | |

(Continued)

OTHER PUBLICATIONS

First Action Interview Preinterview Communication dated Oct. 26, 2015 in U.S. Appl. No. 14/827,062, 7 pages.

(Continued)

*Primary Examiner* — Marcus R Smith

(57) ABSTRACT

The invention is directed to methods and systems for generating reference signals from radio signals received from a large-coverage access component, such as a base station. The radio signals are received, analyzed, and selected based on the analysis. The selected signals are processed by an oscillator to filter out abnormalities. Consequently, a reference signal is generated that is encapsulated into packets and delivered to one or more small-coverage access components using the Precision Timing Protocol or some other protocol that is useable by the small-coverage access components. The small-coverage access components comprise one or more of a femtocell or a picocell.

19 Claims, 10 Drawing Sheets

(56) References Cited

U.S. PATENT DOCUMENTS

| | | | |
|---|---|---|---|
| 2013/0107793 A1* | 5/2013 | Gan | H04B 7/155 370/315 |
| 2013/0122917 A1* | 5/2013 | Yavuz | H04J 3/0638 455/450 |
| 2013/0155945 A1 | 6/2013 | Chen | |
| 2014/0206414 A1* | 7/2014 | Oh | H04B 7/0404 455/562.1 |
| 2014/0242989 A1 | 8/2014 | Cai et al. | |
| 2015/0245308 A1* | 8/2015 | Lorca Hernando | H04W 56/0015 370/209 |
| 2015/0257024 A1* | 9/2015 | Baid | H04W 24/10 370/338 |

OTHER PUBLICATIONS

First Action Interview Office Action dated Dec. 8, 2015 in U.S. Appl. No. 14/827,062, 8 pages.
Notice of Allowance dated Mar. 25, 2016 in U.S. Appl. No. 14/827,062, 7 pages.
Bladsjö, David et al., "Synchronization Aspects in LTE Small Cells", IEEE Communications Magazine, Sep. 2013, pp. 70-77.

* cited by examiner

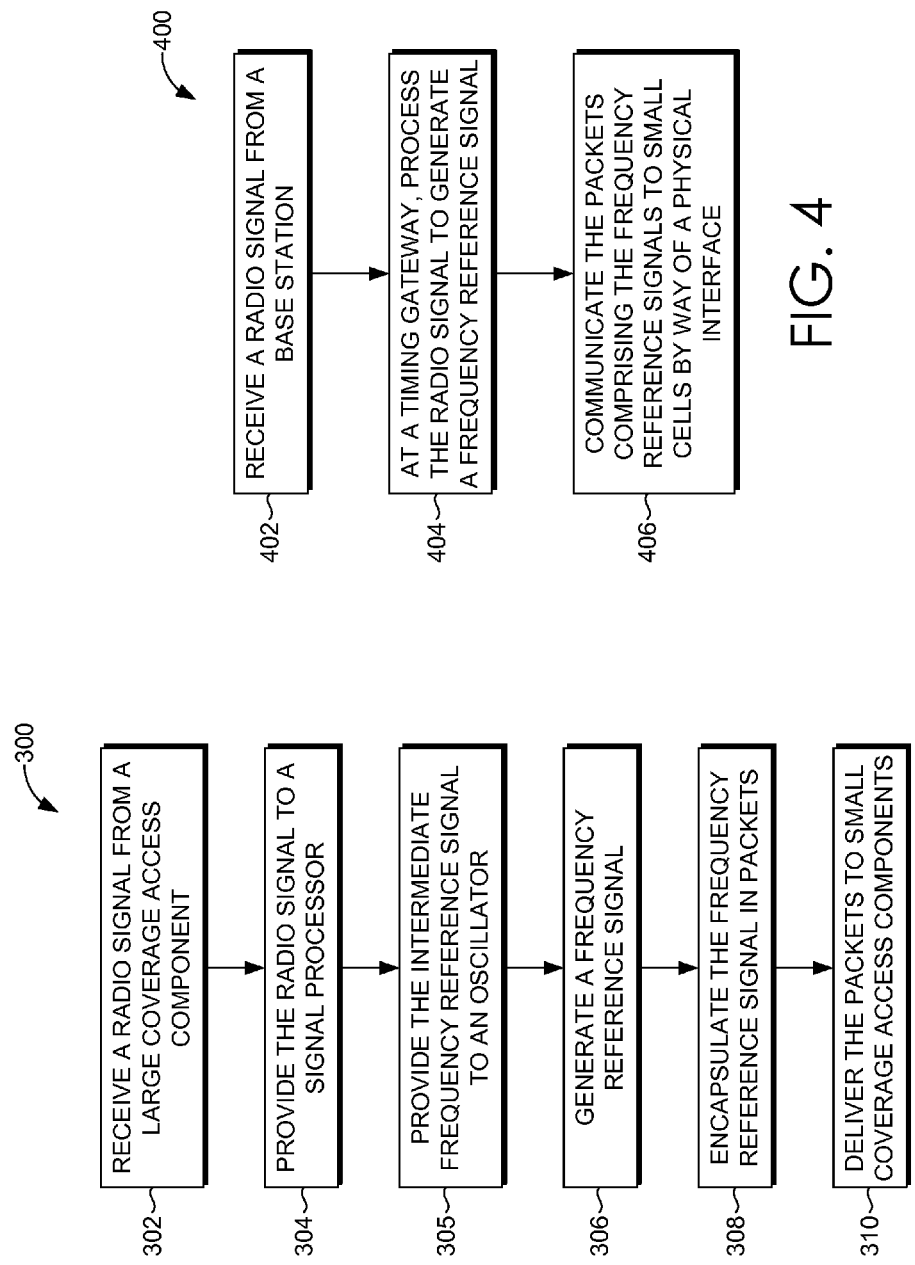

GENERATING REFERENCE SIGNALS FROM SELECTED SIGNALS

CROSS-REFERENCE TO RELATED APPLICATIONS

This application is a continuation-in-part of U.S. application Ser. No. 14/018,948, filed Sep. 5, 2013 and entitled "GENERATING FREQUENCY REFERENCE SIGNALS," the entirety of which is hereby incorporated by reference.

SUMMARY

A high-level overview of various aspects of the invention is provided here for that reason, to provide an overview of the disclosure and to introduce a selection of concepts further described below in the detailed description. This summary is not intended to identify key features or essential features of the claimed subject matter, nor is it intended to be used as an aid in isolation to determine the scope of the claimed subject matter.

In brief and at a high level, this disclosure describes, among other things, methods and systems for generating a frequency reference signal for synchronization of one or more small cells from a radio signal received from a large-coverage access component, such as a macro cell (e.g., base station, eNodeB). Instead of utilizing the GPS for synchronization, using embodiments of the present invention, dependence on GPS by the small cells is unnecessary, as a neighboring macro cell transmits a GPS traceable radio signal that is received by a timing gateway located near the small cells. The timing gateway includes, in one embodiment, a receiving component, a signal processor, an oscillator, and a master component. The master component, in one embodiment, creates Precision Timing Protocol (PTP) frames that are delivered to the small cells by way of a physical interface, such as an Ethernet physical interface.

In other embodiments, the output from the oscillator may be used to derive other traditional clock reference signals, including, for example, 10 MHz, 1 pps squarewave, DS1, E1, etc.

BRIEF DESCRIPTION OF THE SEVERAL VIEWS OF THE DRAWINGS

Illustrative embodiments of the present invention are described in detail below with reference to the attached drawing figures, and wherein:

FIG. 3 depicts a flow chart of a method for generating frequency reference signals from a received radio signal, in accordance with an embodiment of the present invention;

FIG. 4 depicts a flow chart of a method for generating frequency reference signals from a received radio signal, in accordance with an embodiment of the present invention;

DETAILED DESCRIPTION

Figure 1:
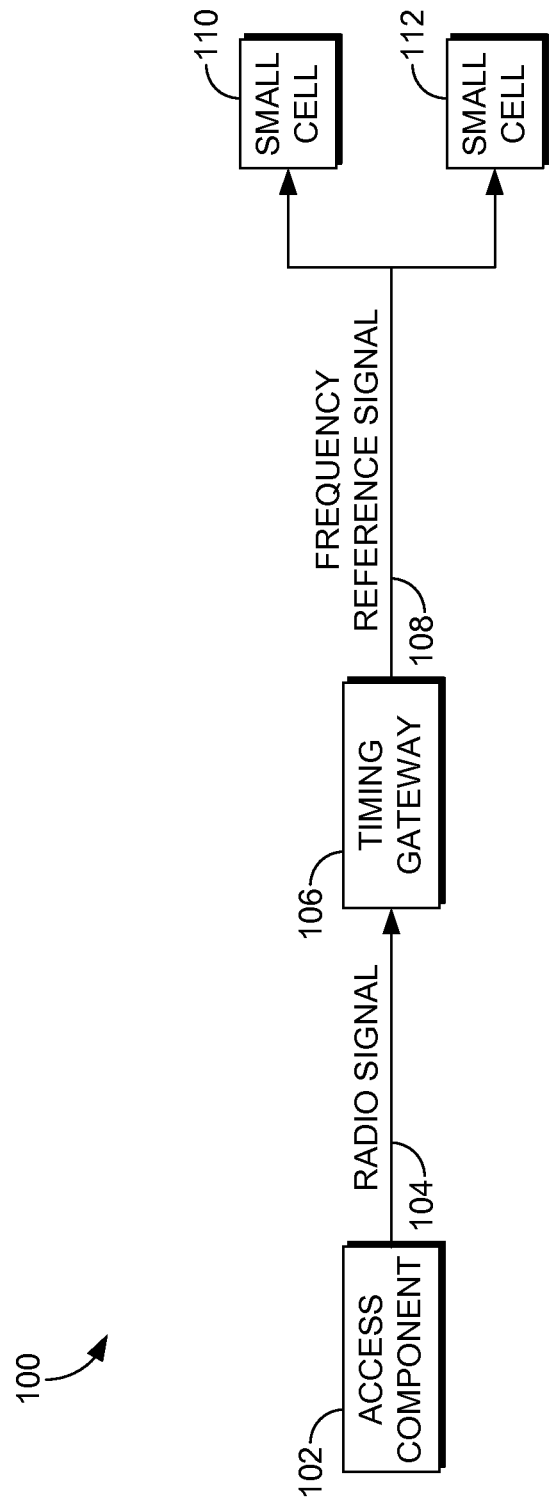
FIG. 1 depicts an exemplary illustration of a timing gateway implemented in accordance with an embodiment of the present invention.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

3GPP Third Generation Partnership Project
BTS Base Transceiver Station
CDMA Code Division Multiple Access
CDROM Compact Disc Read-Only Memory
DS1 Digital Signal 1
DVD Digital Versatile Disc
E1 E-carrier signal 1
EEPROM Electronically Erasable Programmable Read-Only Memory
eHRPD Enhanced High Rate Packet Data
eNodeB Evolved Node B
E-UTRA Evolved Universal Terrestrial Radio Access
EVDO Evolution Data Optimized
FDD Frequency Division Duplex
GPS Global Positioning System
GSM Global System for Mobile Communications
HRPD High Rate Packet Data
IEEE Institute of Electrical and Electronics Engineers
IPv4 Internet Protocol version 4
IPv6 Internet Protocol version 6
LPP Long Term Evolution Positioning Protocol
LTE Long Term Evolution
PPS Pulse Per Second
PTP Precision Timing Protocol
RAM Random-Access Memory
RF Radio Frequency
RNC Radio Network Controller
ROM Read-Only Memory
SyncE Synchronous Ethernet
TDD Time Division Duplex
TDM Time Division Multiplex
UDP User Datagram Protocol WAN Wide Area Network
WiFi Wireless Local Area Network
WiMAX Worldwide Interoperability for Microwave Access Further, various technical terms are used throughout this description. A definition of such terms can be found in, for example, Newton's Telecom Dictionary by H. Newton, 27th Edition (2013) or 3GPP TS 36.355 version 9.0.0 Release 9. These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of our technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

As mentioned, embodiments of the present invention are directed toward generating frequency reference signals that are used to provide frequency synchronization to small cells, such as picocells and femtocells. While GPS receivers, TDM circuits, and SyncE typically are used to satisfy synchronization requirements, utilizing embodiments of the present invention, a radio signal from a neighboring large-coverage access component (e.g., macro cell, base station, eNodeB) is sent to a timing gateway for processing the radio signal to generate a frequency reference signal. The large-coverage access component is close enough in proximity to the timing gateway such that the timing gateway, by way of a receiving component having an antenna, is able to receive the signal from the large-coverage access component. In an embodiment, the large-coverage access component is capable of outputting an LTE-FDD radio signal that is traceable to the GPS reference. The timing gateway generates a frequency reference signal that is encapsulated into packets for transmission to one or more small-coverage access components, or small cells (e.g., femtocell, picocell). In an embodiment, the timing gateway includes a receiving component, a signal processor, an oscillator, and a master component. The timing gateway, in an embodiment, is located near the small-coverage access components such that the packets can be delivered to the small-coverage access components by way of a physical interface, such as by an Ethernet connection.

Typical applications for small-coverage access components include filling in gaps in coverage for large-coverage access components and providing coverage inside of buildings or other structures. Typically, a building having one or more small-coverage access components will be in the vicinity of one or more large-coverage access components, such that an optimally placed antenna could receive a signal from a neighboring base station, for example. The higher signal strength of the large-coverage access component signal as compared to a different type of signal, such as a GPS signal, makes the radio signal less vulnerable to interference. In one embodiment, Precision Timing Protocol, which uses the IEEE-1588v2 protocol is used to transfer the frequency reference signal from the timing gateway to the collocated small-coverage access components. However, in alternative embodiments, other protocols may be used, and other types of outputs may be generated, including 10 MHz, 1 pps squarewave, DS1, E1, and other clock references.

In a first aspect of the present invention, a method is provided for generating frequency reference signals from a received radio signal. The method includes receiving a radio signal from a large-coverage access component, providing the radio signal to a signal processor that converts the radio signal into an intermediate reference signal, providing the intermediate reference signal to an oscillator, and filtering jitter and other abnormalities from the radio signal to generate a frequency reference signal. The method further includes encapsulating the frequency reference signal into packets that are useable by one or more small-coverage access components, and delivering the packets that comprise the frequency reference signal to the one or more small-coverage access components through a physical interface.

In a second aspect of the present invention, computer-readable media having computer-executable instructions embodied thereon that, when executed, perform a method for generating frequency reference signals from a received radio signal are provided. The method includes receiving a radio signal from a base station in a wireless communications network and, at a timing gateway, processing the radio signal provided by the base station to generate an intermediate frequency reference signal. The processing includes filtering the intermediate frequency reference signal to remove jitter and other abnormalities in the intermediate frequency reference signal by passing the intermediate frequency reference signal through an oscillator to produce a frequency reference signal, encapsulating the frequency reference signal into packets that are useable by one or more small cells, and communicating the packets comprising the frequency reference signal to the one or more small cells by way of a physical interface. The one or more small cells are one or more of a picocell or a femtocell that communicate data with at least one mobile device in the wireless communications network and that are interconnected to the physical interface.

In a third aspect of the present invention, a timing gateway is provided for generating reference signals from a received radio signal. The timing gateway includes a receiving component having an antenna that receives a radio signal from a large-coverage access component. The radio signal is used to generate a reference signal to synchronize one or more small-coverage access components, and the large-coverage access component transmits radio signals for communicating data with mobile devices in a wireless communications network and acts as a source of accurate synchronization for the one or more small-coverage access components. The timing gateway further includes a signal processor that generates an intermediate reference signal from the radio signal, and an oscillator that generates the reference signal by filtering jitter and other abnormalities in the intermediate reference signal. Additionally, the timing gateway includes a master component that encapsulates the reference signal generated by the oscillator into packets. The packets are distributed to the one or more small-coverage access components by way of a physical interface. Further, the one or more small-coverage access components are collocated and receive the packets containing the reference signal by way of the physical interface.

In a fourth aspect of the present invention, a method is provided for generating a reference signal from a plurality of radio signals. The method includes receiving a plurality of radio signals from one or more large-coverage access components, analyzing signal quality of each of the plurality of radio signals, and selecting at least one of the plurality of radio signals based on the analysis. The method also provides the at least one selected radio signal to a signal processor that converts the at least one selected radio signal into an intermediate reference signal, and further generates a reference signal from the intermediate reference signal. Thereafter, the reference signal is communicated to one or more small cells through a physical interface.

In a fifth aspect of the present invention, computer-readable media having computer-executable instructions embodied thereon that, when executed, perform a method for synchronizing one or more small cells by generating a frequency, phase, and time reference signal from a selected radio signal. The method comprises receiving one or more radio signals from at least one base station capable of outputting a Long Term Evolution Time Division Duplex (LTE-TDD) signal. The method includes determining signal quality of the one or more radio signals and selecting at least one of the one or more radio signals based on the determination of the signal quality. At a timing gateway, the at least one selected radio signal provided by the at least one base station is processed to generate an intermediate reference signal. The processing also includes filtering jitter and other abnormalities from the intermediate reference signal to generate a frequency, phase, and time reference signal. Additionally, the method includes encapsulating the frequency, phase, and time reference signal into packets and communicating the packets that comprise the frequency, phase, and time reference signal to one or more small cells through a physical interface.

In a sixth aspect of the present invention, a timing gateway is provided for generating frequency, phase, and time reference signals from a received radio signal. The timing gateway includes a receiving component having an antenna that receives one or more radio signals from at least one large-coverage access component. The one or more radio signals are used to generate a frequency, phase, and time reference signal to synchronize one or more small-coverage access components. The at least one large-coverage access component transmits a Long Term Evolution Time Division Duplex (LTE-TDD) radio signal for communicating data with mobile devices in a wireless communications network and acts as a source of accurate frequency, phase, and time synchronization for the one or more small-coverage access components. Further, the timing gateway includes a signal processor that generates an intermediate frequency, phase, and time reference signal from the one or more received radio signals. The timing gateway also includes an oscillator that generates the frequency, phase, and time reference signal by filtering jitter and other abnormalities in the intermediate frequency, phase, and time reference signal. Additionally, the timing gateway includes a master component that encapsulates the frequency, phase, and time reference signal generated by the oscillator into packets. The packets are distributed to the one or more small-coverage access components by way of a physical interface. Further, the one or more small-coverage access components are collocated and receive the packets containing the frequency, phase, and time reference signal by way of the physical interface.

Long Term Evolution-Frequency Division Duplex

Initially referring to FIG. 1, an exemplary illustration 100 is provided of a timing gateway implemented in accordance with an embodiment of the present invention. While the individual components of the timing gateway are not illustrated in FIG. 1, FIG. 1 provides a high-level overview of the process described herein. Initially, a large-coverage access component 102 is illustrated. As used herein, a large-coverage access component 102 refers to a piece of equipment that facilitates wireless communication between user equipment, such as a mobile device, and what some skilled artisans refer to as a wireless communications network. In one embodiment, the large-coverage access component 102 is a macro cell, and more particularly, is a macro cell capable of outputting a Long Term Evolution-Frequency Division Duplex (LTE-FDD) signal. An LTE-FDD signal refers to a signal sent by a macro cell that is associated with a wireless communication network that utilizes LTE technology, and that operates using the FDD mode of operation. The transmitted LTE-FDD signal is organized into subframes of one millisecond (ms) duration, and ten subframes constitute a radio frame. There are two carrier frequencies, one for uplink transmission and one for downlink transmission. During each frame, there are consequently ten uplink subframes and ten downlink subframes, and uplink and downlink transmission can occur simultaneously within a cell.

The network with which the large-coverage access component 102 operates may include GSM, CDMA, WAN, WiFi, WiMAX, LTE, LTE Advanced, EVDO, HRPD, eHRPD, and the like. These technologies are listed for exemplary purposes only, and are not meant to limit the scope of the present invention. A wireless communications network may comprise one or more of the components illustrated in FIG. 1, but in one embodiment, the wireless communications network includes a cell tower, a BTS, an RNC, gateways, etc. Not all components that make up a wireless communications network are shown. Also, not all connections or possible connections are shown. In one embodiment, the large-coverage access component 102 is a base station, such as a base transceiver station (BTS). The large-coverage access component 102 may include a BTS and a cell tower for example. Further, the large-coverage access component 102 may be any other device that facilitates large coverage communication between mobile devices and the network. For example, if the wireless communications network utilizes LTE technology, the large-coverage access component 102 may be termed eNodeB. As used herein, large coverage refers to the ability of an access component to serve mobile devices in a large area, which, in some embodiments, would not include small WiFi routers, small hotspot devices, picocells, femtocells, and the like. Large-coverage access components 102 are typically able to transmit radio signals with a high strength to a large area or even to a large quantity of user devices. In embodiments, the large-coverage access component 102 provides coverage to a larger geographical area than small-coverage access components 110 and 112, which will be discussed in more detail herein. For example, the typical range of a large-coverage access component 102, such as a standard base station (e.g., macro cell), may be in the range of 5 to 10 miles, depending on frequency band, whereas the range of a small-coverage access component is typically much less.

The large-coverage access component 102, in embodiments described herein, is able to transmit a radio signal 104 that is received by a receiving component within the timing gateway 106. For example, a building with a particularly dense population of individuals having mobile devices may benefit from the use of one or more small cells, such as small cells 110 and 112. In this example, an optimally placed antenna could receive the radio signal 104 from a neighboring base station, such as the large-coverage access component 102. In embodiments, the timing gateway 106 generates a frequency reference signal 108 from the radio signal 104. The frequency reference signal 108 provides for synchronization of the small-coverage access components 110 and 112. Synchronization is essential in a wireless communications network, and generally refers to a technique applied to ensure that all access components in a wireless communications network are operating within performance parameters defined by the appropriate standard, such as 3GPP or the like. Synchronization is achieved by delivering a specifically formatted clock signal to an access component's radio. Lack of synchronization is destabilizing to a wireless communications network and may result in dropped calls or in incorrect data being transmitted to a mobile device. For many reasons, including the need to deliver higher bandwidth and alleviate the burdens on large-coverage access components, small-coverage access components, such as picocells and femtocells, are more frequently being used to supplement existing access components in a network. However, these small-coverage access components require a different approach to providing synchronization to these sites than to large-coverage access components.

Returning to FIG. 1, the particular functioning of the timing gateway 106 will be described with more specificity herein, but generally, the timing gateway 106 is responsible for generating a frequency reference signal that can be delivered to small-coverage access components that are collocated, such as in the same or neighboring building structure. In one embodiment, the timing gateway 106 includes a receiving component, a signal processor, an oscillator, and a master component. The timing gateway 106 communicates the frequency reference signal in a packet through a physical interface, such as an Ethernet physical interface.

As mentioned, the small-coverage access components 110 and 112 may be any type of access component that provides radio signals to a mobile device, therefore facilitating communication between the mobile device and the wireless communications network. The small-coverage access components 110 and 112 cover a smaller geographical area than the large-coverage access component 102. In one embodiment, the small-coverage access components 110 and 112 are one or more of a femtocell or a picocell. A femtocell is a small, low-powered cellular base station that serves a smaller coverage area than a large-coverage access component 102, such as a standard base station used in conjunction with a cell tower. Sometimes categorized as a small cell, a femtocell connects to the service provider's network via broadband, such as DSL or cable via a local router. A femtocell allows a service provider to extend service coverage indoors, for example, or at the cell edge, especially where access would otherwise be limited or unavailable. Femtocells are base stations that typically handle voice communications in a network.

A picocell is a small cellular base station that also covers a small geographical area, such as in-building or on aircraft. In wireless communications network, picocells, like femtocells, are typically used to extend coverage to indoor areas where outdoor signals do not reach well, or to add network capacity in areas with very dense phone usage, such as train stations. Picocells are base stations that typically handle data communications in a network.

When certain types of base stations, such as small-coverage access components (e.g., femtocell or picocell), are deployed in a building, it is difficult to provide a GPS signal to these small-coverage access components. For example, femtocells usually need a GPS input to maintain frequency and phase synchronization. In many cases, a clear line of sight for GPS may be difficult if not impossible. Femtocells and picocells may be deployed together or deployed separately in a network. As mentioned, femtocells are base stations that handle voice communications in a network. Picocells are base stations that handle data communications in the network.

When femtocells are deployed within a building using the GPS signal as a synchronization source, it may be costly if GPS distribution is needed. This problem becomes acute especially with the deployment of a particular type of femtocell called an eFemto or enterprise femtocell because multiple femtocells are required on various floors. eFemtos or enterprise femtocells can be found deployed in businesses or nonresidential buildings. However, femtocells can be deployed in either a residence or commercial environment. The majority of femtocells will be deployed in an enterprise area. Because of the deficiencies described above with respect to the use of a GPS signal for synchronization of small-coverage access components, methods described herein may be used to overcome these deficiencies. For example, receiving a radio signal 104 from a large-coverage access component 102 provides a high-strength signal as compared to a GPS signal, and makes the radio signal 104 less vulnerable to interference.

Figure 2:
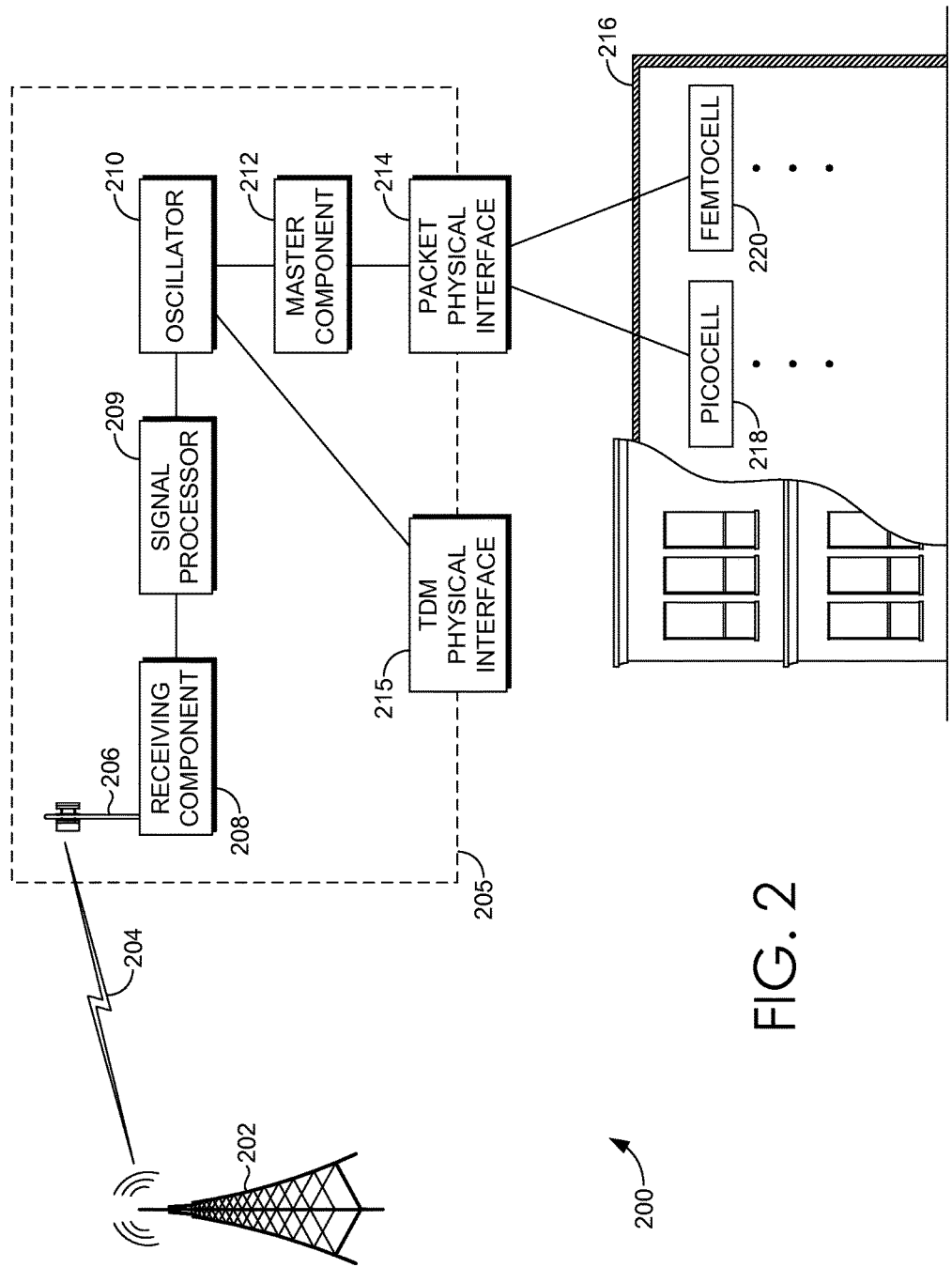
FIG. 2 depicts an exemplary operating system for carrying out embodiments of the present invention.

Turning now to FIG. 2, an exemplary operating system is depicted for carrying out embodiments of the present invention. FIG. 2 depicts an illustrative operating environment, referenced generally by the numeral 200, and illustrates an exemplary networking environment that enables the generation of a frequency reference signal from a radio signal from a large-coverage access component 202, without use of a GPS signal. The illustrative operating environment 200 shown in FIG. 2 is merely an example of one suitable operating environment and is not intended to suggest any limitation as to the scope of use or functionality of embodiments of the present invention. Neither should the operating environment 200 be interpreted as having any dependency or requirement related to any single module/component or combination of modules/components illustrated therein.

A large-coverage access component 202 transmits a radio signal 204 to a timing gateway 205. As mentioned, the large-coverage access component 202 may be any type of device that is capable of transmitting a radio signal. In one embodiment, the large-coverage access component 202 is a standard base station that has a large coverage area, as opposed to a small cell (e.g., picocell, femtocell) that has a small coverage area. In an LTE network, the large-coverage access component 202 may be an eNodeB. Instead of using a GPS as the source of frequency synchronization, the large-coverage access component 202 is the source of the radio signal 204, which is used to generate the frequency reference signal by the timing gateway 205.

The timing gateway 205 includes a receiving component 208, a signal processor 209, an oscillator 210, and a master component 212. The receiving component 208 may include an antenna 206 for receiving the radio signal 204 transmitted by the large-coverage access component 202. The signal is then sent to the signal processor 209. Generally, the signal processor 209 is responsible for processing the received radio signal and converting it to an intermediate frequency reference signal. The output of the signal processor 209 (e.g., intermediate frequency reference signal) provides the input to oscillator 210. Oscillator 210 provides stability to the frequency reference in the timing gateway 205. An exemplary oscillator implemented in the present invention is a crystal oscillator. However, with other implementations, other oscillators may also be employed depending on the stability or hold-over required. Such oscillators could include a rubidium oscillator, cesium oscillator, or hydrogen maser oscillator. The output of the oscillator 210 is a highly accurate reference signal. In one embodiment, the oscillator 210 filters the intermediate frequency reference signal from the signal processor 209, provides stability, etc. This reference signal is transmitted to the master component 212, which is responsible for encapsulating the frequency reference signal into packets for transmission to the small-coverage access components. In one embodiment, the master component 212 creates Precision Timing Protocol (PTP) frames. The packets are transmitted to small-coverage access components through a packet physical interface 214. In one embodiment, the packet physical interface 214 is a wired interface, and utilizes an Ethernet connection to send the packets to the small-coverage access components. In other embodiments, the TDM physical interface provides TDM frequency reference signals such as DS1, E1, 1 pps squarewave and 10 MHz.

In one embodiment, PTP, which uses the IEEE-1588v2 protocol, is used to transfer the frequency reference signals from the timing gateway 205 to the small-coverage access components. PTP is a protocol that is used to synchronize clocks in a network. As mentioned, PTP is implemented in accordance to IEEE 1588 protocol, or may be implemented according to another clock synchronization protocol. PTP can be transported over various physical layers. In the embodiment here, PTP is transported over Ethernet, also known as PTP over IEEE 802.3 or PTP over Ethernet. PTP can also be found in implementations such as PTP over UDP over IPv4 and PTP over UDP over IPv6. The IEEE 1588 standard describes a hierarchical master-slave architecture for clock distribution. Under this architecture, a time distribution system consists of one or more communication media (network segments), and one or more clocks.

While in one embodiment, the master component 212 outputs a PTP signal, in alternative embodiments, the master component 212 outputs signals that utilize other technologies or protocols, such as 10 MHz, 1 pps squarewave, digital signal 1 (DS1), and E1.

Returning to FIG. 2, as mentioned, the master component 212 encapsulates the frequency reference signals into packets for transfer to the small-coverage access components through the packet physical interface 214. In the embodiment of FIG. 2, the small cells, or small-coverage access components include a picocell 218 and a femtocell 220, both being housed in a building 216. As further described herein, multiple small-coverage access components may be collocated, such as in a single building or other structure to assist with a service provider's coverage and building penetration. The picocell 218 and the femtocell 220 may be interconnected to the packet physical interface 214 to receive the necessary frequency synchronization from the timing gateway 205. In one embodiment, two or more small-coverage access components are collocated in a single building or structure, or are in separate structures that are close in proximity.

As mentioned, in embodiments, PTP may not be utilized, and thus the frequency reference signals may not be delivered to the small cells in a packet through the packet physical interface 214. Instead, the frequency reference signals may be communicated to the small cells by way of a TDM physical interface 215. Time Division Multiplexing (TDM) is a method of transmitting and receiving independent signals over a common signal path by means of synchronized switches at each end of the transmission line so that each signal appears on the line only a fraction of time in an alternating pattern. Signals such as 10 MHz, 1 pps squarewave, digital signal 1 (DS1), and E1 may be transmitted to the small cells by way of the TDM physical interface 215.

Turning now to FIG. 3, a flow chart is depicted of a method 300 for generating frequency reference signals from a received radio signal, in accordance with an embodiment of the present invention. At step 302, a radio signal is received from a large-coverage access component. In embodiments, the large-coverage access component whose frequency reference is traceable to GPS or some other highly accurate frequency reference source is a macro cell, such as a macro cell that is capable of outputting an LTE-FDD signal. Generally, the large-coverage access component is capable of providing coverage to a larger geographical area than a small-coverage access component, as it generally sends out stronger signals than a small-coverage access component. In one embodiment, the large-coverage access component is a base station. The base station may utilize GPS technology, but the radio signal itself originates from the base station, not the GPS. At step 304, the radio signal is provided to a signal processor for processing the radio signal to generate an intermediate frequency reference signal. At step 305, the intermediate frequency reference signal is provided to an oscillator. At step 306, the radio signal is oscillated to generate a frequency reference signal from the intermediate frequency reference signal. The oscillator filters jitter and other abnormalities from the radio signal, and provides stability for the reference signal.

At step 308, the frequency reference signal is encapsulated into packets. In one embodiment, PTP is the protocol used to transport the frequency reference signal to the small-coverage access components. As mentioned, PTP is a mechanism for transporting a value of time from a grand-master clock in the form of a timestamp across packet networks. The syntax of the protocol is master-slave, and it has means for the slave clock to measure packet flight times on the uplink and downlink sides of the path. PTP may deliver both a phase signal in the form of one pulse per second and frequency. Other protocols that may be used in embodiments described herein to deliver the frequency reference signal include Network Time Protocol, SyncE, or a combination thereof. Once the frequency reference signal is encapsulated into packets according to the PTP or another protocol, the packets are delivered to small-coverage access components, which, in embodiments, include picocells and/or femtocells.

FIG. 4 depicts a flow chart of a method 400 for generating frequency reference signals from a received radio signal, in accordance with an embodiment of the present invention. Initially, a radio signal is received from a base station at step 402. The base station may be neighboring (e.g., close in proximity) to a grouping of collocated small cells in a common building or other structure. In embodiments, the signal is not received from a GPS, but instead from a base station, such as a base station or other macro cell that is capable of outputting an LTE-FDD radio signal. At step 404, at a timing gateway, the radio signal is processed to generate a frequency reference signal. The timing gateway, in one embodiment, includes a receiving component that receives a radio signal from a neighboring macro cell, such as a base station, a signal processor for converting the radio signal into a frequency reference signal, an oscillator for filtering out abnormalities in the radio signal, and a master component for encapsulating the frequency reference signal generated by the oscillator into packets. The packets comprising the frequency reference signals are then communicated to the small cells by way of a physical interface, shown at step 406.

While embodiments have been described with reference to receiving a radio signal from a large-coverage access component, further embodiments are capable of receiving a plurality of radio signals and analyzing multiple received radio signals. This disclosure further describes methods and systems for generating a frequency reference signal or a frequency, phase and time reference signal for synchronization of one or more small cells from selected radio signals received from large-coverage access components. Using embodiments of the present invention, one or more radio signals are received, analyzed, and selected for the generation of reference signals at the timing gateway. As previously described, in one embodiment, the timing gateway includes, a receiving component, a signal processor, an oscillator, and a master component for creating Precision Timing Protocol (PTP) frames that are delivered to the small cells by way of a physical interface. In other embodiments, the output from the oscillator may be used to derive other traditional clock reference signals, including, for example, 10 MHz, 1 pps squarewave, time of day, DS1, E1, etc.

Long Term Evolution-Time Division Duplex (TDD)

Figure 8:
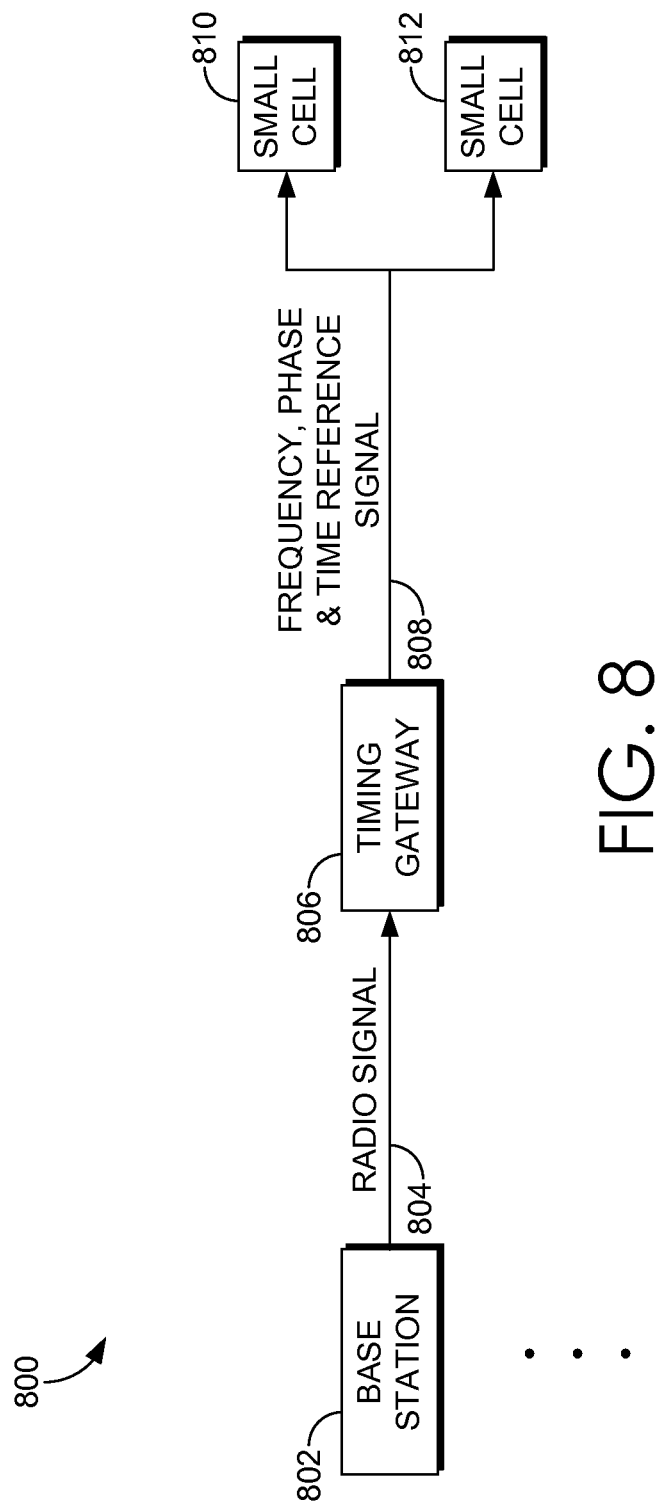
FIG. 8 depicts an exemplary illustration of a timing gateway implemented in accordance with an embodiment of the present invention.

Referring now to FIG. 8, an exemplary illustration 800 is shown of a timing gateway 806 implemented in accordance with an embodiment of the present invention. FIG. 8 is intended only to provide a high-level overview, and as such, individual components of the timing gateway 806 are not illustrated. The individual components described herein may be similar to those discussed regarding FIG. 5. Initially, at least one large base station 102 is illustrated. The at least one base station 802 refers to a piece of equipment or device that facilitates large coverage wireless communication between user equipment (e.g., mobile devices) and a wireless communications network. The wireless communications network may include GSM, CDMA, WAN, WiFi, WiMAX, LTE, LTE Advanced, EVDO, HRPD, eHRPD, and the like. In various embodiments, said network includes a cell tower, a BTS, an RNC, gateways, etc. As mentioned, these technologies are exemplary only and are not meant to limit the scope of the present invention. Not all components, connections, or possible connections that make up a wireless communications network are shown. Typically the at least one base station 802 is able to transmit radio signals with a high strength to a large area or even to a large quantity of user devices. In one embodiment, the at least one base station 802 is a macro cell or eNodeB outputting an LTE-TDD radio signal. The at least one base station 802 is able to transmit one or more radio signals 804. The one or more radio signals 804 are received by a receiving component within the timing gateway 806. In embodiments, the timing gateway 806 generates a frequency, phase, and time reference signal 808 from the one or more radio signals 804 for synchronization of small cells 810 and 812 (e.g., picocells, femtocells). The timing gateway 806 may communicate or deliver the frequency, phase, and time reference signal to small-cells through a physical interface. Further embodiments, including components and functions of the timing gateway 806 have been discussed at length previously.

Figure 6:
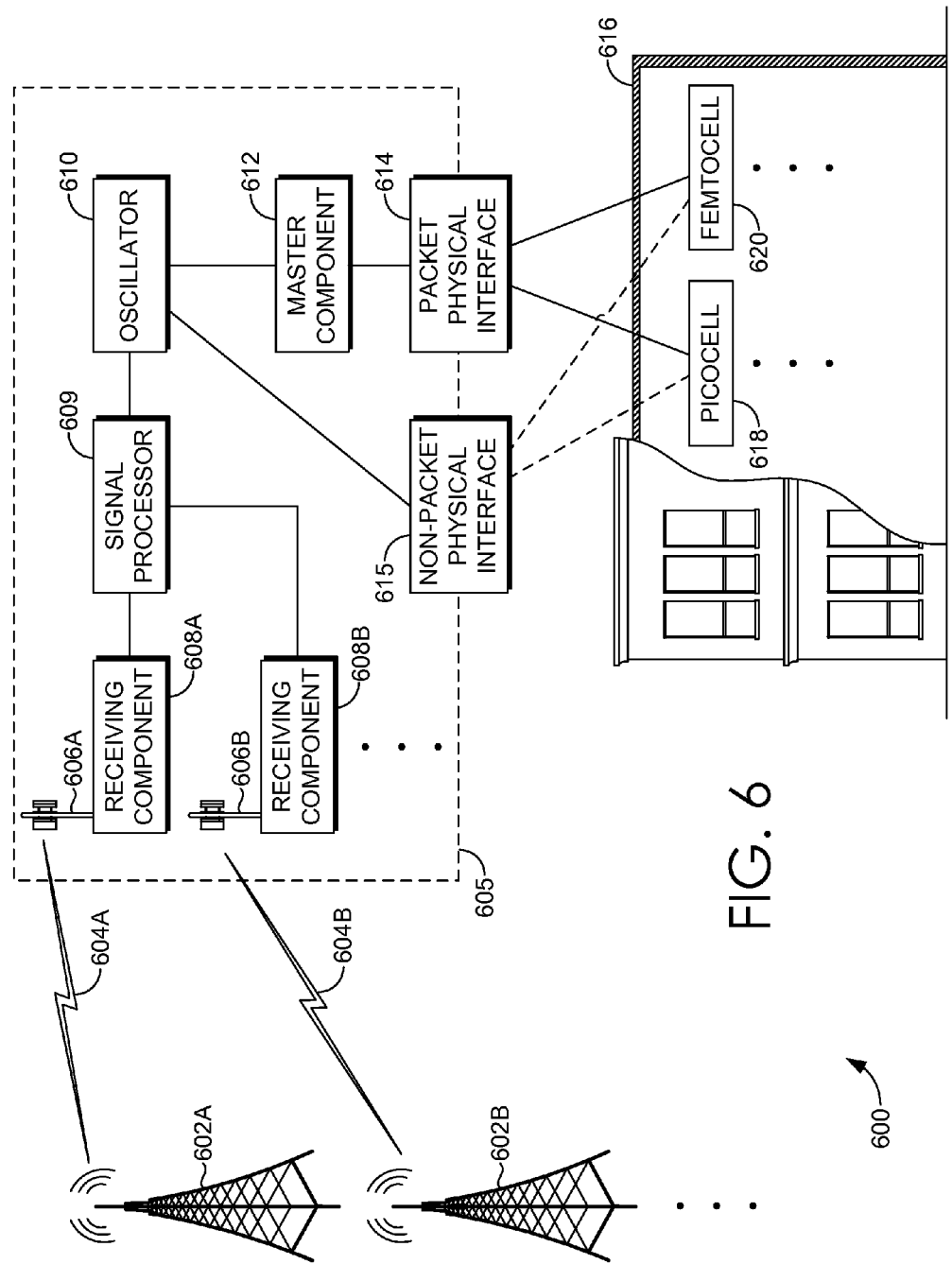
FIG. 6 depicts an exemplary operating system for carrying out embodiments of the present invention.
Figure 9:
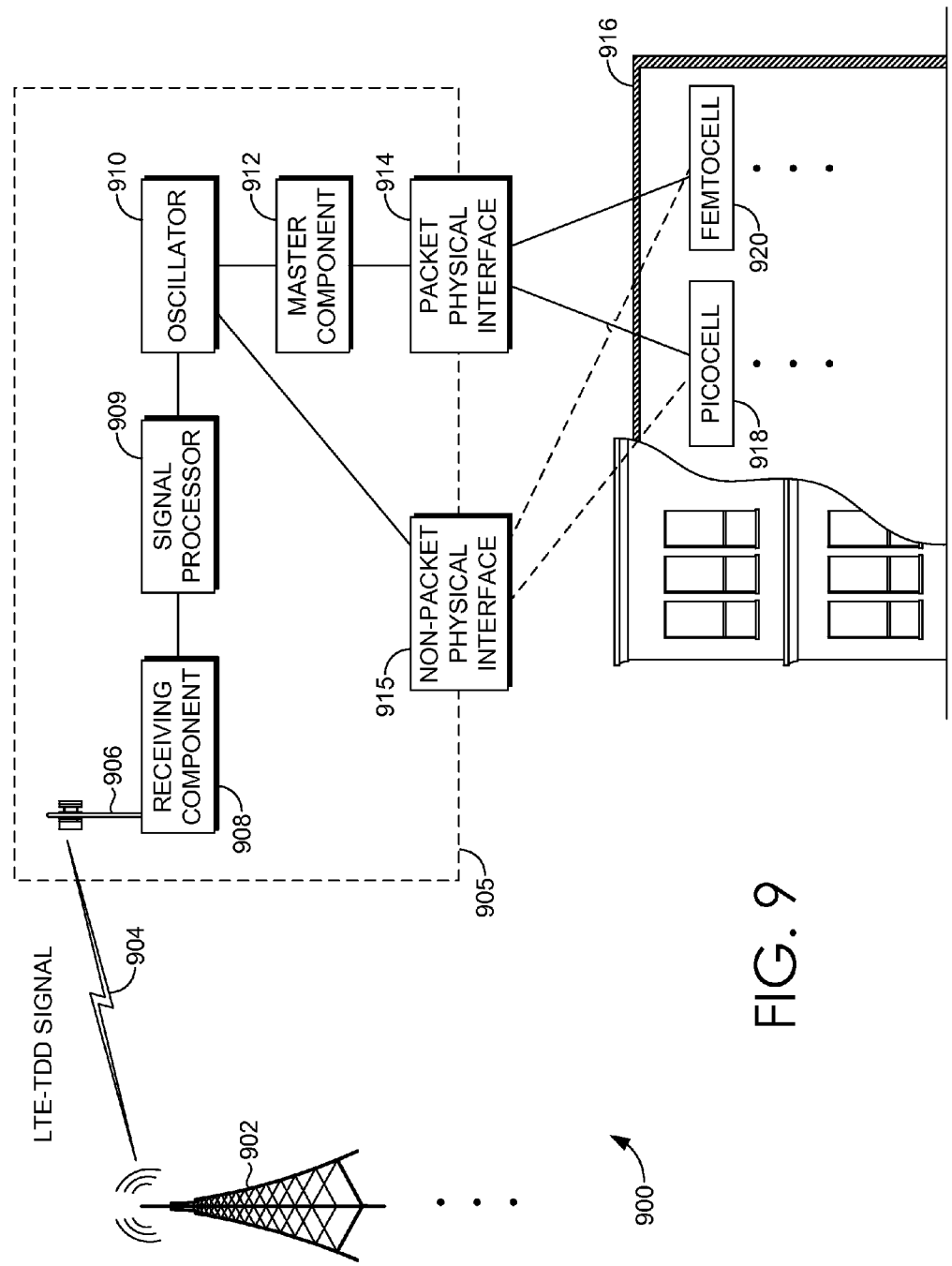
FIG. 9 depicts an exemplary operating system for carrying out embodiments of the present invention.

FIG. 9 depicts an exemplary operating environment 900, similar to FIG. 6, for carrying out embodiments of the present invention. The illustrative operating environment 900 shown in FIG. 9 is merely one example of a suitable operating environment and is not intended to suggest any limitation as to the scope of use or functionality of embodiments of the present invention. Neither should the illustrative operating environment 900 be interpreted as having any dependency or requirement related to any single component or combination of components illustrated therein. Although some components are shown in the singular, they might be plural.

At least one base station 902 capable of outputting a LTE-TDD radio signal transmits one or more radio signals 904. A timing gateway 905 receives the one or more radio signals 904. Instead of using a GPS as the source of small cell synchronization, the at least one base station 902 is the source of the one or more radio signals 904 used to generate the reference signal at the timing gateway 905. As mentioned, frequency and phase may be derived directly from the received LTE-TDD signal. An acceptable source of time may be obtained through the use of LTE Positioning Protocol (LPP).

The timing gateway 905 includes a receiving component 908, a signal processor 909, an oscillator 910, and a master component 912, discussed hereinabove. At the timing gateway 905, the signal quality of each of the one or more radio signals 904 may be analyzed, and selected based on the analysis. The selected radio signal is provided to the signal processor 909 for processing and converting it to an intermediate reference signal. The output of the signal processor 909 (e.g., intermediate reference signal) provides the input to the oscillator 910. The oscillator 910 provides stability to the intermediate reference signal, and in further embodiments, the oscillator 910 filters jitter and other abnormalities from the intermediate reference signal. Exemplary oscillators have been previously described. In the embodiment, the output of the oscillator 910 is a frequency, phase, and time reference signal. In one aspect, the reference signal is transmitted from the oscillator 910 to the master component 912, where it may be encapsulated into packets for transmission to small-coverage access components. As described prior, the master component 912 may create PTP frames the transfer of packets through a packet physical interface 914. In an alternative embodiment, the reference signal is transmitted from the oscillator 910 to a non-packet physical interface 915, bypassing the master component 912. The reference signal is then transmitted from the timing gateway 905 to the small-cells using a non-packet physical interface 915. The small-cells include a picocell 918 and a femtocell 920, both housed in a building 916. Multiple small-cells may be collocated in a single building or other structure to assist with a service provider's coverage and building penetration. The picocell 918 and the femtocell 920 may be interconnected to the packet physical interface 914 or the non-packet physical interface 915.

Figure 10:
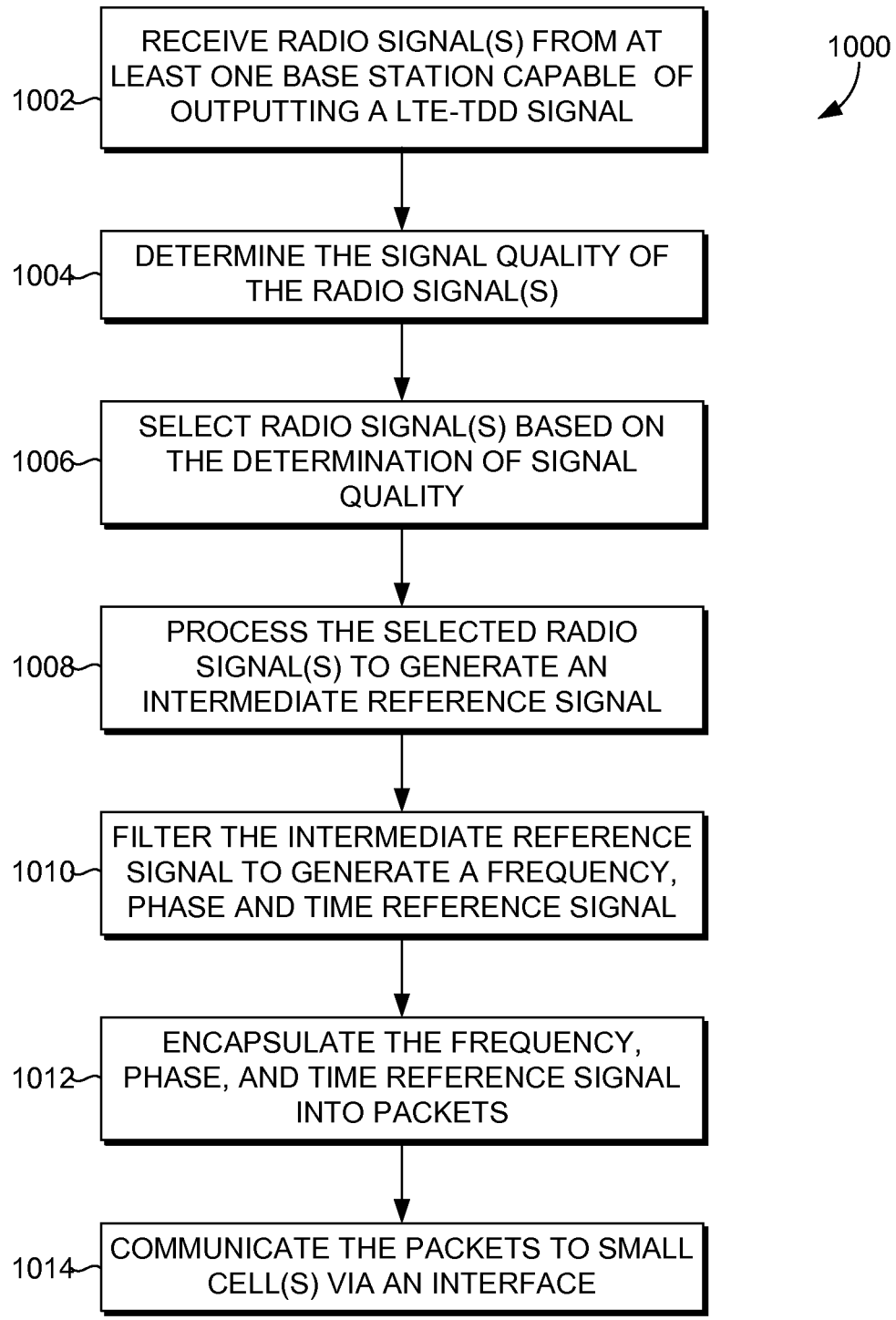
FIG. 10 depicts a flow chart of a method for generating a frequency, phase, and time reference signal from one or more radio signals, in accordance with an embodiment of the present invention.

FIG. 10 depicts a flow chart of a method 1000 for generating frequency, phase, and time reference signals from one or more received radio signals, in accordance with an embodiment of the present invention. Beginning at block 1002, the method 1000 includes receiving one or more radio signals from at least one base station capable of outputting a Long Term Evolution Time Division Duplex (LTE-TDD) signal. The base station may be neighboring (e.g., close in proximity) to a grouping of collocated small cells in a common building or other structure.

At block 1004 the method includes determining the signal quality of the one or more radio signals. The signal quality may be determined based at least on frequency, signal strength, frequency stability, a signal quality threshold, or a combination thereof. In other embodiments, determining signal quality may include evaluating whether each of the one or more radio signals meets a signal quality threshold, wherein the signal quality threshold may be user-determined, preset, or dynamically determined. In yet another aspect, the method further comprises determining to ensemble the one or more radio signals into an ensemble signal. Further signal quality characteristics and their analysis have been discussed at length hereinabove.

Turning now to block 1006, the method 1000 comprises selecting at least one of the one or more radio signals based on the determination of the signal quality. Once selected, at block 1008, the method includes processing, at a timing gateway, the at least one selected signal provided by the at least one base station to generate an intermediate reference signal. In generating the intermediate reference signal, frequency and phase information may be derived directly from the at least one selected radio signal, wherein the radio signal is an LTE-TDD signal. Additionally, an acceptable source of time may be obtained through the use of LTE Positioning Protocol (LPP). In embodiments, the timing gateway may include one or more receiving components, each having at least one antenna for receiving LTE-TDD signals. The timing gateway may further comprise a signal processor and an oscillator. The oscillator performs filtering jitter and other abnormalities from the intermediate reference signal to generate a frequency, phase, and time reference signal, shown at block 1010. At block 1012, the timing gateway includes a master component for encapsulating the frequency, phase, and time reference signal into packets. And at block 1014, the method includes communicating the packets that comprise the frequency, phase, and time reference signal to one or more small cells through a physical interface. Said packets may be communicated by way of PTP or an alternative protocol.

Figure 11:
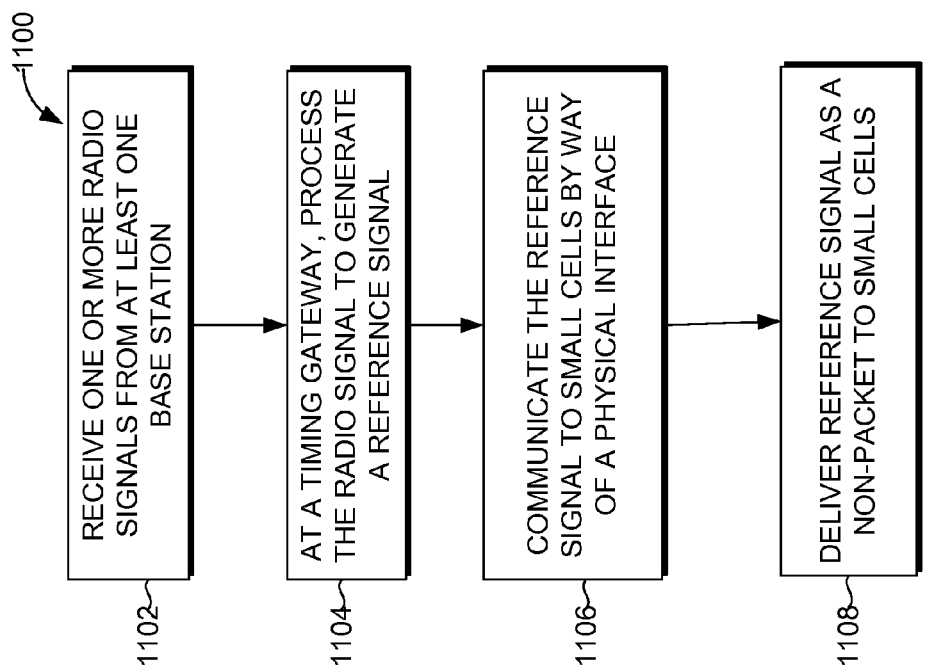
FIG. 11 depicts a flow chart of a method for generating reference signals from one or more radio signals, in accordance with an embodiment of the present invention.

FIG. 11 depicts an alternative embodiment, wherein a reference signal is not encapsulated into packets and PTP is not used. In the alternative embodiment illustrated in FIG. 11, the reference signal is communicated to small cells through a non-packet physical interface and delivered as a non-packet to the small-cells. At block 1102, one or more radio signals are received from at least one base station. At block 1104, a timing gateway processes the radio signals to generate a reference signal. The reference signal is communicated to small cells by way of a physical interface, shown at block 1106. At block 1108, the reference signal is delivered as a non-packet to small cells.

Long Term Evolution-FDD and TDD

Figure 5:
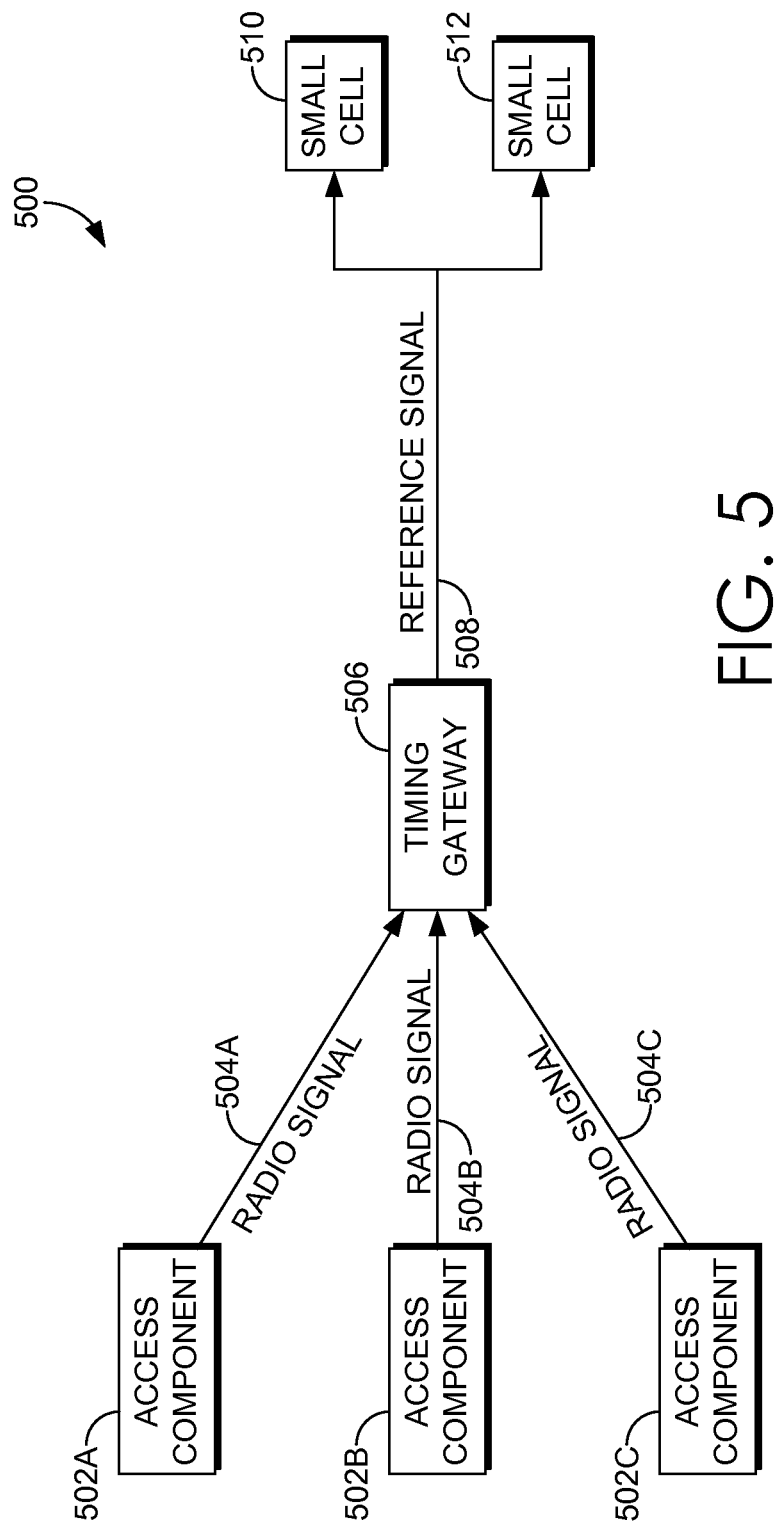
FIG. 5 depicts an exemplary illustration of a timing gateway implemented in accordance with an embodiment of the present invention.

Referring now to FIG. 5, an exemplary illustration 500 is shown of a timing gateway 506 implemented in accordance with an embodiment of the present invention. While the individual components of the timing gateway 506 are not illustrated in FIG. 5, FIG. 5 is intended to provide a high-level overview of the process described herein. Initially, large-coverage access components 502A, 502B, and 502C are illustrated. As used herein, the large-coverage access components 502A, 502B, and 502C refer to pieces of equipment that facilitate wireless communication between user equipment, such as a mobile device, and what some skilled artisans refer to as a wireless communications network.

FIG. 5 and the description herein refer to embodiments of the present invention generally, and as such, may apply to both Long Term Evolution-Frequency Division Duplex (LTE-FDD) and Long Term Evolution-Time Division Duplex (LTE-TDD) technologies. FIG. 5 is a generic system diagram that illustrates multiple radio signals received at a timing gateway that are used to generate a reference signal that can be transmitted to one or more small cells. As such, both LTE-FDD and LTE-TDD technologies may be used in conjunction with the system of FIG. 5.

In one embodiment, the large-coverage access components 502A, 502B, and 502C are macro cells, capable of outputting radio signals 502A, 502B, and 502C. More particularly, the large-coverage access components 502A, 502B, and 502C are macro cells capable of outputting LTE-FDD radio signals. An LTE-FDD signal refers to a signal sent by a macro cell that is associated with a wireless communications network that utilizes LTE technology, and that operates using the FDD mode of operation. The transmitted LTE-FDD signal is organized into subframes of one millisecond (ms) duration, where ten subframes constitute a radio frame. There are two carrier frequencies, one for uplink transmission and one for downlink transmission. During each frame, there are consequently ten uplink subframes and ten downlink subframes, where uplink and downlink transmission can occur simultaneously within a cell.

Alternatively and as described above, the large-coverage access components 502A, 502B, and 502C may be macro cells capable of outputting LTE-TDD radio signals. An LTE-TDD signal is associated with a wireless communications network utilizing LTE technology, and operates using the TDD mode of operation. A transmitted LTE-TDD signal is organized into a single carrier frequency that alternates between uplink transmission and downlink transmission time periods. In contrast to LTE-FDD, in a LTE-TDD mode, uplink and downlink transmissions do not occur simultaneously within a cell. Instead, during one time period, the entire carrier frequency is devoted to either uplink or downlink transmissions. For example, during a time period allotted for downlink transmission, the entire carrier frequency is devoted to downlink transmission. This may allow for a greater data volume to be transmitted within the time window, as the entire carrier frequency is available for downlink transmission. No uplink transmissions may occur during this time period. At the end of the downlink transmission time period, the entire carrier frequency becomes available for uplink transmission only. LTE-TDD thereby allows for asymmetrical data transmission in a single direction at one time.

The network within which the large-coverage access components 502A, 502B, and 502C operate may include GSM, CDMA, WAN, WiFi, WiMAX, LTE, LTE Advanced, EVDO, HRPD, eHRPD, and the like, wherein the large-coverage access components 502A, 502B, and 502C may output LTE-FDD or LTE-TDD signals. These technologies are listed for exemplary purposes only, and are not meant to limit the scope of the present invention. A wireless communications network may comprise one or more of the components illustrated in FIG. 5, but in one embodiment, the wireless communications network includes a cell tower, a BTS, an RNC, gateways, etc. Not all components that make up a wireless communications network are shown. Also, not all connections or possible connections are shown.

The large-coverage access components 502A, 502B, and 502C may be any device that facilitates large coverage communication between mobile devices and the network. In one embodiment, the large-coverage access components 502A, 502B, and 502C are base stations, such as a base transceiver station (BTS). The large-coverage access components 502A, 502B, and 502C may include a BTS and a cell tower, for example. In one aspect, if the wireless communications network utilizes LTE technology, each large-coverage access component 502A, 502B, and 502C may be termed an eNodeB. While the large-coverage access components 502A, 502B, and 502C may be devices of the same type or kind or, alternatively, they may be devices of different type or kind that facilitate large coverage communication between mobile devices and the network.

As used herein, large coverage refers an access component's ability to serve mobile devices in a large area, which, in some embodiments, excludes small WiFi routers, small hotspot devices, picocells, femtocells, and the like. Large-coverage access components 502A, 502B, and 502C are typically able to transmit high strength radio signals to a large area or even to a large quantity of user devices. In embodiments, the large-coverage access components 502A, 502B, and 502C provide coverage to a larger geographical area than small-coverage access components. For example, the typical range of large-coverage access components 502A, 502B, and 502C, such as standard base stations (e.g., macro cells), may be in the range of five to ten miles, depending on frequency band, whereas the range of small-coverage access components are typically much less.

In embodiments described herein, the large-coverage access components 502A, 502B, and 502C are able to transmit radio signals 504A, 504B, and 504C that are received by a receiving component within the timing gateway 506. In one example, an optimally placed antenna coupled to a receiving component could receive the radio signals 504A, 504B, and 504C from neighboring base stations, such as the large-coverage access components 502A, 502B, and 502C. In embodiments, the timing gateway 506 generates a reference signal 508 using one or more of the radio signals 504A, 504B, and 504C. The reference signal 508 provides for synchronization of the small-coverage access components, such as small cells 510 and 512. Synchronization is essential in a wireless communications network, and generally refers to a technique applied to ensure that all access components in a wireless communications network are operating within performance parameters defined by the appropriate standard, such as 3GPP or the like. Synchronization is achieved by delivering a specifically formatted clock signal to an access component's radio. Lack of synchronization is destabilizing to a wireless communications network and may result in dropped calls or in incorrect data being transmitted to a mobile device. For many reasons, including the need to deliver higher bandwidth and alleviate the burdens on large-coverage access components 502A, 502B, and 502C, small-coverage access components, such as picocells and femtocells, are more frequently being used to supplement existing access components in a network. For example, a building with a particularly dense population of individuals having mobile devices may benefit from the use of one or more small cells, such as small cells 510 and 512. However, small-coverage access components require a different approach to providing synchronization than large-coverage access components.

Returning to FIG. 5, generally the timing gateway 506 is responsible for generating, from one or more radio signals, a reference signal that may be delivered to collocated small-coverage access components (e.g. picocells located in the same or neighboring building structure). In one embodiment, the timing gateway 506 includes a receiving component, a signal processor, an oscillator, and a master component. The timing gateway 506 communicates the reference signal in a packet through a packet physical interface, such as an Ethernet physical interface. The packet may contain information regarding frequency, or alternatively, frequency, phase, and time. Alternatively, in other embodiments, the timing gateway 506 may communicate the reference signal to small-coverage access components through a non-packet physical interface.

As mentioned, small-coverage access components, such as small cells 510 and 512, may include any type of access component that provides radio signals to a mobile device, therefore facilitating communication between the mobile device and the wireless communications network. Small-coverage access components cover a smaller geographical area than large-coverage access components 502A, 502B, and 502C. In one embodiment, the small-coverage access components are one or more of a femtocell and/or a picocell. A femtocell is a small, low-powered cellular base station that serves a smaller coverage area than large-coverage access components 502A, 502B, and 502C, such as a standard base station used in conjunction with a cell tower. Sometimes categorized as a small cell, a femtocell connects to the service provider's network via broadband, such as DSL or cable via a local router. A femtocell allows a service provider to extend service coverage indoors, for example, or at the cell edge, especially where access would otherwise be limited or unavailable. Femtocells are base stations that typically handle voice communications in a network. A picocell is a small cellular base station that also covers a small geographical area, such as in-building or on aircraft. In a wireless communications network, picocells, like femtocells, are typically used to extend coverage to indoor areas which outdoor signals have difficulty penetrating. Additionally, picocells may be used to add network capacity in areas with very dense phone usage, such as train stations, high rise buildings, and airports. Picocells are base stations that typically handle data communications in a network. Femtocells and picocells may be deployed together or deployed separately in a network. Small-coverage access components have a range than is smaller than large-coverage access components.

It may be difficult to provide a GPS signal to small-coverage access components (e.g., femtocell or picocell) deployed in buildings, as in many cases, the GPS signal does not have a clear line of sight to the small-coverage access components. For instance, femtocells usually need a GPS input to maintain frequency and phase synchronization. However, without a clear line of sight, maintaining frequency and phase synchronization of the femtocell may be difficult, if not impossible. When femtocells are deployed within a building using the GPS signal as a synchronization source, it may be costly where GPS distribution is needed. This problem becomes acute especially with the deployment of a particular type of femtocell called an eFemto or enterprise femtocell because multiple femtocells are required to be distributed on various floors of a building. eFemtos or enterprise femtocells may be found deployed in businesses or nonresidential buildings. Femtocells may also be deployed in a residence or commercial environment. The majority of femtocells will be deployed in an enterprise area. Because of the deficiencies described above with respect to the use of a GPS signal for synchronization of small-coverage access components, methods described herein may be used to overcome these deficiencies. For example, large-coverage access components 502A, 502B, and 502C provide a high-strength signal as compared to a GPS signal, thereby making the radio signals 504A, 504B, and 504C less vulnerable to interference. In another example, large-coverage access components 502A, 502B, and 502C are components other than a Global Positioning System (GPS) and the radio signals used to create a reference signal do not use GPS. Instead, the frequency and phase information may be derived directly from the received LTE signal. An acceptable source of reference time may be obtained through the use of LTE Positioning Protocol (LPP).

Turning now to FIG. 6, an exemplary operating environment 600 is depicted for carrying out embodiments of the present invention. FIG. 6 depicts an exemplary operating environment 600 that enables the generation of a reference signal from a plurality of radio signals 604A and 604B transmitted from one or more large-coverage access components 602A and 602B, without use of a GPS signal, or in the absence of a GPS signal. The illustrative operating environment 600 shown in FIG. 6 is merely one example of a suitable operating environment and is not intended to suggest any limitation as to the scope of use or functionality of embodiments of the present invention. Neither should the illustrative operating environment 600 be interpreted as having any dependency or requirement related to any single component or combination of components illustrated therein. Although some components are shown in the singular, they might be plural.

Each large-coverage access component 602A and 602B transmits radio signals 604A and 604B to a timing gateway 605. As mentioned, the large-coverage access components 602A and 602B may be any kind of type of device capable of transmitting a radio signal. In one embodiment, the large-coverage access components 602A and 602B are standard base stations that have a large coverage area, as opposed to small cells (e.g., picocell, femtocell) that have a small coverage area. In an LTE network, each large-coverage access component 602A and 602B may be an eNodeB. Instead of using a GPS as the source of small cell synchronization, the large-coverage access components 602A and 602B are the source of radio signals 604A and 604B used to generate the reference signal at the timing gateway 605. As mentioned, frequency and phase may be derived directly from the received LTE signal. An acceptable source of time may be obtained through the use of LTE Positioning Protocol (LPP).

The timing gateway 605 includes one or more receiving components 608A and 608B, a signal processor 609, an oscillator 610, and a master component 612. Each of the receiving components 608A and 608B may include an antenna 606A and 606B for receiving the radio signals 604A and 604B transmitted by the large-coverage access components 602A and 602B. In one embodiment, each receiving component is capable of receiving one radio signal (e.g. one receiving component locks onto one radio signal). In another embodiment, one receiving component is capable of contemporaneously receiving more than one radio signal. At the timing gateway 605, the signal quality of each of the received radio signals 604A and 604B may be analyzed. Based on this analysis, at least one of the radio signals 604A and 604B may be selected. The selected radio signal is then sent or provided to the signal processor 609. Generally, the signal processor 609 is responsible for processing the selected radio signal and converting it to an intermediate reference signal. The output of the signal processor 609 (e.g., intermediate reference signal) provides the input to the oscillator 610.

The oscillator 610 provides stability to the reference in the timing gateway 605. In further embodiments, the oscillator 610 filters jitter and other abnormalities from the intermediate reference signal. An exemplary oscillator implemented in the present invention is a crystal oscillator. However, with other implementations, other oscillators may also be employed depending on the stability or hold-over required. Such oscillators could include a rubidium oscillator, cesium oscillator, or hydrogen maser oscillator. The output of the oscillator 610 is a highly accurate reference signal. In one embodiment, the output of the oscillator 610 is a frequency reference signal. In other embodiments, the output of the oscillator 610 is a frequency, phase, and time reference signal.

In one aspect, the reference signal is transmitted from the oscillator 610 to the master component 612. The master component 612 is responsible for encapsulating the reference signal into packets for transmission to small-coverage access components. In one embodiment, the master component 612 creates PTP frames. In said embodiment, PTP is used to transfer the reference signal information (e.g., time and frequency in the case of TDD technology), as encapsulated in packets, from the timing gateway 605 to the small-coverage access components through a packet physical interface 614. In one embodiment, the packet physical interface 614 is a wired interface, and utilizes an Ethernet connection to send the packets to the small-coverage access components.

PTP is a protocol that is used to synchronize clocks in a network. PTP is implemented in accordance to IEEE 1588v2 protocol, or may be implemented according to another clock synchronization protocol. PTP can be transported over various physical layers. In the embodiment here, PTP is transported over Ethernet, also known as PTP over IEEE 802.3 or PTP over Ethernet. PTP can also be found in implementations such as PTP over UDP over IPv4 and PTP over UDP over IPv6. The IEEE 1588 standard describes a hierarchical master-slave architecture for clock distribution. Under this architecture, a time distribution system consists of one or more communication media (network segments), and one or more clocks. While in one embodiment, the master component 612 utilizes PTP, in alternative embodiments, the master component 612 outputs signals that utilize other technologies or protocols. In an alternative aspect, the reference signal is transmitted from the oscillator 610 to a non-packet physical interface 615, bypassing the master component 612 described above. The reference signal information is transmitted from the timing gateway 605 to the small-coverage access components using a non-packet physical interface 615. The non-packet physical interface 615 (e.g., TDM physical interface) may transfer or communicate the reference signal information (e.g. DS1, E1, 10 MHz, 1 pps). TDM is a method of transmitting and receiving independent signals over a common signal path by means of synchronized switches at each end of the transmission line so that each signal appears on the line only a fraction of time in an alternating pattern.

Returning to FIG. 6, as mentioned, the reference signal information is transferred to the small-coverage access components through the packet physical interface 614 or the non-packet physical interface 615. In the embodiment of FIG. 6, the small-coverage access components include a picocell 618 and a femtocell 620, both housed in a building 616. As further described herein, multiple small-coverage access components may be collocated, such as in a single building or other structure to assist with a service provider's coverage and building penetration. The picocell 618 and the femtocell 620 may be interconnected to the packet physical interface 614 or the non-packet physical interface 615 to receive the necessary synchronization from the timing gateway 605. In one embodiment, two or more small-coverage access components are collocated in a single building or structure, or are in separate structures that are close in proximity.

Figure 7:
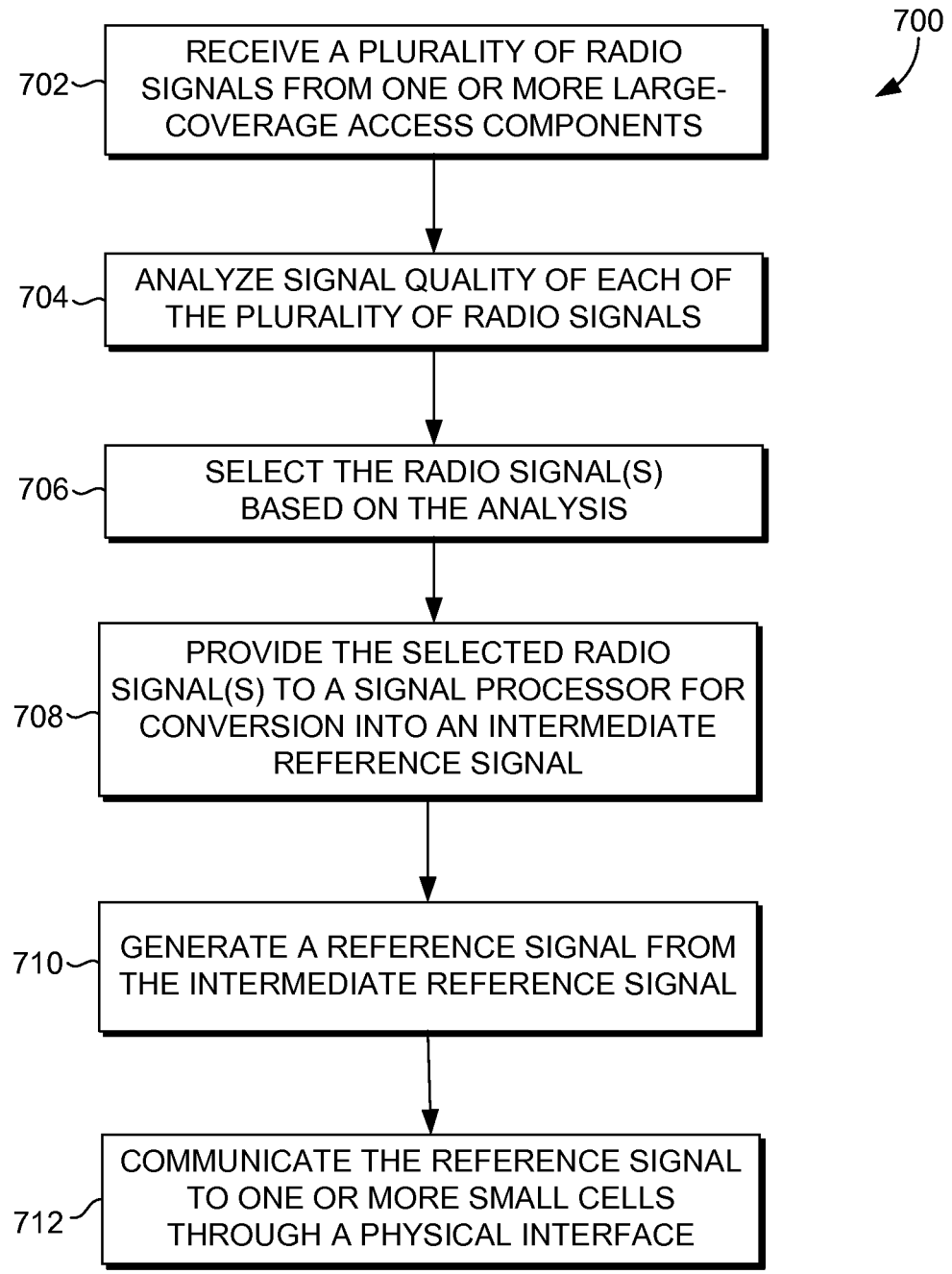
FIG. 7 depicts a flow chart of a method for generating a reference signal from a plurality of radio signals, in accordance with an embodiment of the present invention.

Turning now to FIG. 7, an exemplary method 700 is illustrated as a collection of blocks representing operations that can be implemented in hardware, software, firmware, or a combination thereof. The blocks should not be interpreted as having any sequential requirement and any number of the described blocks can be combined in any order to implement the methods or alternate methods. Additionally, individual operations may be omitted from the method 700 without departing from the spirit and scope of the subject matter described herein. In the context of software, the blocks represent computer instructions that, when executed by one or more processors, perform the recited operations. Neither should the method 700 be interpreted as having any dependency on a module(s), component(s), or combination thereof.

FIG. 7 depicts a method 700 for generating a reference signal from selected radio signals, in accordance with embodiments of the present invention. Initially, at block 702, a plurality of radio signals, such as 604A and 604B, are received from one or more large-coverage access components. In some embodiments, such large-coverage access components may output LTE-FDD radio signals. In alternative embodiments, such large-coverage access components may output LTE-TDD radio signals. In other aspects, the large-coverage access components whose references are traceable to GPS, LPP, E-UTRA or some other highly accurate reference source, are macro cells. In yet another aspect, the large-coverage access components are base stations. Each base station may utilize GPS technology, but the radio signals themselves originate from the base stations, not the GPS.

At block 704, the method includes analyzing signal quality of each of the plurality of radio signals. Signal quality may be examined and evaluated based on frequency, signal strength, frequency stability, a signal quality threshold, or a combination thereof. Signal quality may be examined and evaluated separately and individually, relative to each of the received plurality of radio signals, relative to a history of received radio signals, or relative to a signal quality threshold. Signal quality factors may be analyzed in light of the specific needs of a timing gateway, network, or small-coverage access components. In various embodiments, analyzing signal quality may include ranking, prioritizing, or weighting signal quality factors or characteristics. In other embodiments, each signal quality characteristic might be equally weighted in the analysis. In further embodiments, the rank, priority, or weight of one or more signal quality factors may be dynamic and responsive to changing conditions or needs of the timing gateway, network, or small-coverage access components. In one example, the signal strength of LTE-TDD radio signals may be prioritized over the frequency stability. In another example, the frequency and frequency stability of LTE-FDD radio signals may be prioritized over the signal strength. In yet another example, the analysis may apply a signal quality threshold to measure and/or automatically qualify one or more received radio signals for selection.

A signal quality threshold may be user-defined or dictated by technical and/or logistical determinations. A signal quality threshold may be specific to a particular timing gateway, network, or small-coverage access components. A signal quality threshold may be set for one or more signal quality factors or characteristics. Alternatively, a signal quality threshold may be based on all, a combination of, or amalgamation of, signal quality factors. Alternatively, there might not be any signal quality threshold(s) or said threshold(s) might be triggered by specific circumstances.

Analyzing signal quality may also include examining the origin of each radio signal in the plurality. Further embodiments include examining one or more of the location, topography, distance, specific network provider, cell-site indicator, or a combination thereof, for each of the one or more large-coverage access components from which a radio signal was received. For exemplary purposes only, a plurality of stable radio signals may be received from three large-coverage access components. Two of the large-coverage access components may be affiliated with a competitor's network provider, whereas one large-coverage access component may not be. Utilizing radio signals from the large-coverage access component that is not affiliated with a competitor may be beneficial or preferred. Thus, through analysis, said radio signals emanating from a non-competitor source may be determined to have a better signal quality than radio signals originating at a competitor's large-coverage access component. In a second example, a plurality of radio signals are received from three nearby large-coverage access components. One of the large-coverage access components may be located closer to the timing gateway than the other two large-coverage access components. As such, a shorter distance from the large-coverage access component to the timing gateway may be beneficial or preferred, especially where distance may be relevant to signal quality (e.g. high frequency signal). As mentioned, in analyzing signal quality, the signal quality characteristics may be totaled, ranked, prioritized, weighted, evaluated individually or relatively, or a combination thereof, as discussed prior.

In other embodiments, analyzing signal quality may include determining that the plurality of radio signals should be ensembled. For example, a plurality of radio signals are received from several large-coverage access components. Taken alone, however, each of the plurality of radio signals may not have a preferred signal quality or may not meet a signal quality threshold. Thus, it may be determined that the plurality of radio signals should be ensembled, or averaged, to create a single representative signal. The signal quality factors or characteristics may be ensembled, alone or together. For example, if frequency stability is a highly ranked signal quality factor in the analysis, the frequency stability of each of the plurality of radio signals may be ensembled and/or averaged to create an ensemble signal. In another example, all the signal quality factors may be ensembled to generate an ensemble signal. Ensembling the plurality of radio signals may include averaging and/or other statistical analysis or computation. In this way, when the analysis reveals that the plurality of received radio signals have suboptimal signal quality or suboptimal signal quality factors, an ensemble signal may be generated to substitute for the plurality of radio signals.

Turning now to block 706, the method 700 includes selecting at least one of the plurality of radio signals based on the analysis described above. In one aspect, a single radio signal having the highest overall signal quality from the plurality of radio signals is selected. In another example, a radio signal having the highest signal quality regarding the highest ranked signal quality characteristic may be selected or chosen. In another aspect, more than one radio signal from the plurality may be selected. For example, if three radio signals meet a signal quality threshold, one or more of the three radio signals may be selected. In yet another aspect, an ensembled signal may be selected.

In further embodiments, the method 700 may include disqualifying from selection at least one disqualified radio signal of the plurality of radio signals, wherein the at least one disqualified radio signal is concurrently timed by the timing gateway. Disqualifying timed radio signals may prevent detrimental timing loops. In another aspect, the method 700 may further include disqualifying from selection at least one disqualified radio signal of the plurality of radio signals that is characterized as having a poorer signal quality than the at least one selected radio signal. Disqualification from selection may be based on the analysis and signal quality characteristics as previously discussed.

At block 708, the method 700 includes providing the at least one selected radio signal to a signal processor that converts the at least one selected radio signal into an intermediate reference signal. The at least one selected radio signal may contain frequency and/or phase information derived directly from, for example, a received LTE signal. Additionally, time information from the at least one selected radio signal may be obtained through the use of LTE Positioning Protocol (LPP). At block 710, a reference signal is generated from the intermediate reference signal. The reference signal may be a frequency, phase, and time reference signal. In further embodiments, generating a reference signal may further include providing the intermediate reference signal to an oscillator. The oscillator may filter jitter and other abnormalities from the intermediate reference signal.

At block 712, the method 700 includes communicating the packets that comprise the reference signal to one or more small cells through a physical interface. Basically, the reference signal is delivered to small-coverage access components, which, in embodiments, include picocells and/or femtocells. In a further embodiment, the method 700 may include encapsulating the reference signal into packets for transmission to small-coverage access components. PTP may be used, such as in the case of LTE-TDD, to transfer the reference signal to the small-coverage access components via packets. As mentioned, PTP is a mechanism for transporting a value of time from a grandmaster clock in the form of a timestamp across packet networks. The syntax of the protocol is master-slave, and it has means for the slave clock to measure packet flight times on uplink and downlink transmissions. Other protocols may be used in embodiments not described herein to deliver the reference signal information. In the further embodiment, once the packets are encapsulated, the packets may be communicated to the one or more small cells through a physical interface, such as a packet physical interface. In alternative embodiments, PTP may not be utilized. In one non-PTP embodiment, the reference signals may not be encapsulated and may not be delivered to the small cells in a packet through the packet physical interface. Instead, the reference signals may be communicated to the small cells by way of a non-packet physical interface. Non-packet output signals may include, for example only, DS1, E1, 10 MHz, and 1 pps.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for selecting a signal for generating a reference signal, the method comprising:
receiving a plurality of radio signals from one or more large-coverage access components, wherein the plurality of radio signals are Long Term Evolution Time Division Duplex (LTE-TDD) signals;
analyzing signal quality of each of the plurality of radio signals received from one or more large-coverage access components;
selecting at least one of the plurality of radio signals based on the signal quality;
providing the at least one selected radio signal to a signal processor that converts the at least one selected radio signal into an intermediate reference signal;
filtering jitter and other abnormalities from the intermediate reference signal to generate a frequency, phase, and time reference signal;
generating, at a timing gateway, a reference signal from the intermediate reference signal, wherein generating the reference signal includes encapsulating the frequency, phase, and time reference signal into packets; and
communicating the reference signal from the timing gateway to one or more small cells through a hardwired physical interface.

2. The method of claim 1, further comprising disqualifying from selection at least one disqualified radio signal of the plurality of radio signals, wherein the at least one disqualified radio signal is concurrently timed by a timing gateway, is characterized as having a poorer signal quality than the at least one selected radio signal, or a combination thereof.

3. The method of claim 1, wherein generating the reference signal further comprises providing the intermediate reference signal to an oscillator for filtering jitter and other abnormalities from the intermediate reference signal to generate the reference signal.

4. The method of claim 1, wherein analyzing the signal quality includes determining that the plurality of radio signals should be ensembled, and wherein the at least one selected radio signal comprises an ensemble of the plurality of radio signals.

5. The method of claim 1, wherein analyzing the signal quality includes examining one or more of frequency, signal strength, frequency stability, or a signal quality threshold of the radio signals.

6. The method of claim 1, wherein at least one of the one or more large-coverage access components are further capable of outputting a Long Term Evolution Frequency Division Duplex (LTE-FDD) signal.

7. The method of claim 1, wherein analyzing signal quality further comprises examining one or more of location, topography, distance, specific network provider, or cell-site indicator of the one or more large-coverage access components.

8. Non-transitory computer-readable media having computer-executable instructions embodied thereon that, when executed, perform a method for synchronizing one or more small cells by generating a frequency, phase, and time reference signal from a selected radio signal, the method comprising:
   receiving one or more radio signals from at least one base station outputting a Long Term Evolution Time Division Duplex (LTE-TDD) signal;
   determining signal quality of each of the one or more radio signals received from the from the at least one base station outputting a LTE-TDD signal;
   selecting at least one of the one or more radio signals based on the determination of the signal quality;
   at a timing gateway, processing the at least one selected radio signal provided by the at least one base station to generate an intermediate reference signal;
   filtering jitter and other abnormalities from the intermediate reference signal to generate a frequency, phase, and time reference signal;
   encapsulating the frequency, phase, and time reference signal into packets; and
   communicating the packets that comprise the frequency, phase, and time reference signal from the timing gateway to one or more small cells through a hardwired physical interface.

9. The media of claim 8, further comprising disqualifying from selection at least one disqualified radio signal of the one or more radio signals, wherein the at least one disqualified radio signal is concurrently timed by a timing gateway, is characterized as having a poorer signal quality than the at least one selected radio signal, or a combination thereof.

10. The media of claim 8, wherein signal quality is determined based on frequency, signal strength, frequency stability, a signal quality threshold, or a combination thereof.

11. The media of claim 8, wherein determining the signal quality further includes evaluating whether each of the one or more radio signals meets a signal quality threshold, wherein the signal quality threshold may be user-determined, preset, or dynamically determined.

12. The media of claim 8, wherein determining the signal quality further comprises examining one or more of the location, topography, distance, specific network provider, cell-site indicator, or a combination thereof, of the at least one base station.

13. The media of claim 8, further comprising determining to ensemble the one or more radio signals into an ensemble signal, and wherein the at least one selected signal is the ensemble signal.

14. The media of claim 13, wherein the ensemble signal is generated by averaging one or more of frequency, signal strength, frequency stability, or a signal quality threshold of the one or more radio signals.

15. The media of claim 8, wherein the timing gateway comprises a receiving component having at least one antenna for receiving a LTE-TDD signal, a signal processor, an oscillator, and a master component for encapsulating the frequency, phase, and time reference signal into the packets.

16. The media of claim 8, wherein the packets are communicated to the one or more small cells by way of a Precision Timing Protocol.

17. A timing gateway for generating frequency, phase, and time reference signals from a received radio signal, the timing gateway comprising:
   a receiving component having an antenna that receives one or more radio signals from at least one large-coverage access component, the one or more radio signals used to generate a frequency, phase, and time reference signal to synchronize one or more small-coverage access components, the at least one large-coverage access component transmitting Long Term Evolution Time Division Duplex (LTE-TDD) radio signals for communicating data with mobile devices in a wireless communications network and acting as a source of accurate frequency, phase, and time synchronization for the one or more small-coverage access components;
   a signal processor that generates an intermediate frequency, phase, and time reference signal from the one or more radio signals received by the receiving component of the timing gateway;
   an oscillator that generates the frequency, phase, and time reference signal by filtering jitter and other abnormalities from the intermediate frequency, phase, and time reference signal generated by the signal processor; and
   a master component that encapsulates the frequency, phase, and time reference signal generated by the oscillator into packets, wherein the packets are distributed from the timing gateway to the one or more small-coverage access components by way of a hardwired physical interface, wherein the one or more small-coverage access components are collocated and receive the packets containing the frequency, phase, and time reference signal by way of the hardwired physical interface.

18. The timing gateway of claim 17, wherein the large-coverage access component is a component other than a Global Positioning System (GPS).

19. The timing gateway of claim 17, wherein the master component for encapsulating the frequency, phase, and time reference signal into the packets further communicates the packets to the one or more small cells by way of a Precision Timing Protocol.

* * * * *